W. D. MARSHALL.
CAMERA.
APPLICATION FILED MAY 8, 1914.
1,235,222.
Patented July 31, 1917.
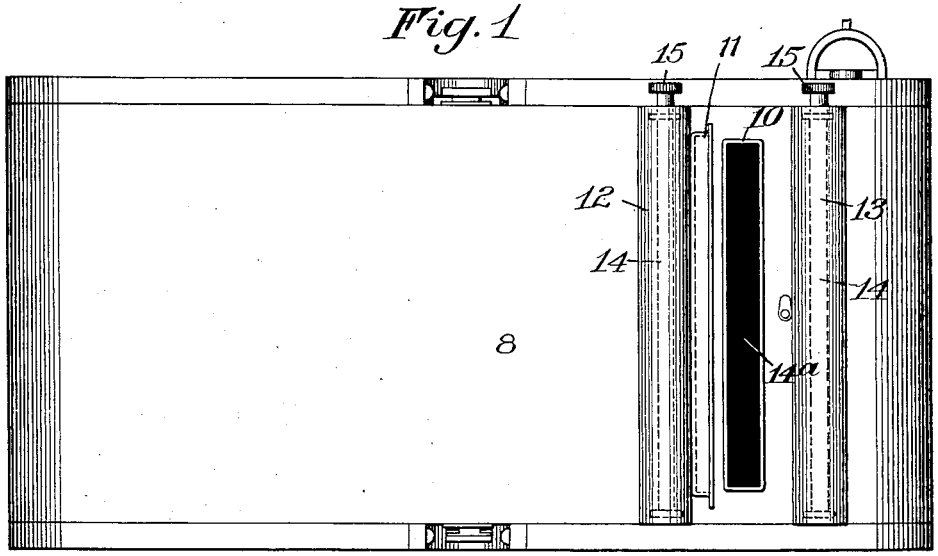
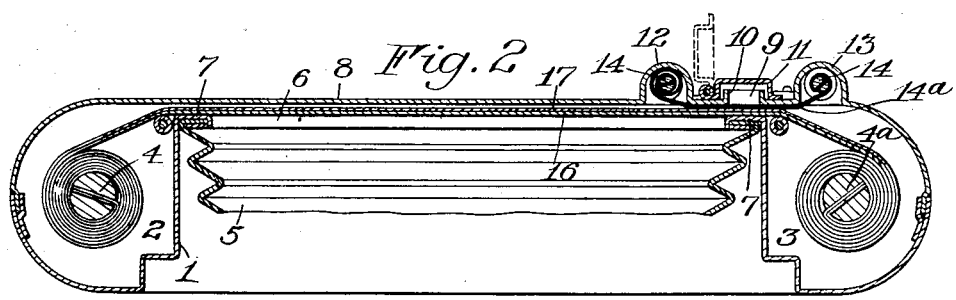
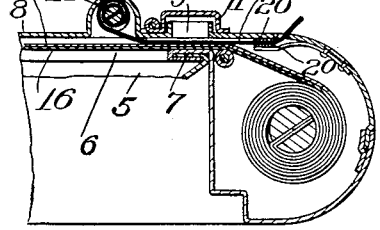
Inventor
Walter D. Marshall
Witnesses
Walter B. Payne
Nelson H. Kopp
By Church & Rich
his Attorneys

UNITED STATES PATENT OFFICE.

WALTER D. MARSHALL, OF ROCHESTER, NEW YORK, ASSIGNOR TO EASTMAN KODAK COMPANY, OF ROCHESTER, NEW YORK, A CORPORATION OF NEW YORK.

CAMERA.

1,235,222.

Specification of Letters Patent.

Patented July 31, 1917.

Application filed May 8, 1914. Serial No. 837,107.

*To all whom it may concern:*

Be it known that I, WALTER D. MARSHALL, of Rochester, in the county of Monroe and State of New York, have invented certain new and useful Improvements in Cameras; and I do hereby declare the following to be a full, clear, and exact description of the same, reference being had to the accompanying drawings, forming a part of this specification, and to the reference-numerals marked thereon.

My invention relates to photographic cameras or holders for sensitized material of the type in which means are provided for enabling the user to write with a stylus or pencil, memoranda or notes regarding the subject matter of the exposure made or to be made, and to cause the same to be light printed upon the film or sensitized material and become visible upon the development of the latter. One type of such camera or holder to which my invention is particularly applicable, employs a covering for the film or sensitized material normally obstructing the passage of actinic light, but portions thereof may be readily displaced when written upon by means of a stylus or pencil so as to permit the passage of actinic light to the film through such displaced portions of the covering, so that the writing or characters will subsequently appear in the developed negative. The invention has for its object to provide means for simplifying the construction and operation of cameras or holders such as above described whereby ordinary photographic roll holding cameras such as are now in use can be readily adapted to carry out that method. To these and other ends the invention consists in certain improvements and combinations of parts all as will be hereinafter more fully described, the novel features being pointed out in the claims at the end of the specification.

In the drawings:

Figure 1 is a rear view of a camera provided with my invention;

Fig. 2 is a longitudinal sectional view; and

Fig. 3 is a similar view of a modification.

Similar reference numerals throughout the several figures indicate the same parts.

The invention is shown applied to a camera of a well known type consisting of a casing 1 provided at the ends with suitable film chambers 2 and 3, the former adapted to contain the spool 4 of unexposed film and the latter, the winding reel or spool $4^a$ of exposed film, said spools being centered and the winding spool rotated by the usual or any suitable mechanism. The casing is provided with the usual exposure aperture 6 surrounded by a frame 7 to which the ordinary bellows 5 is attached, if the casing itself forms part of a camera.

8 indicates a back or cover for the film chambers and for the portion of the film extended between them, having the general shape of the usual camera backs and fastened in position by suitable catches or fastening devices. At one end of back 8 and over one of the ends of the frame 7, is provided an elongated slot or opening 9 extending practically across the back and preferably surmounted by an outwardly extending flange 10, which opening is adapted to be closed by a cover 11 shown as hinged at one side and adapted to be opened, as in dotted lines, and closed and secured by suitable means. The cover is preferably recessed to fit over the flange 10 and make a practically light tight joint when closed. At the sides of the opening 9 the back is extended or bulged outwardly to form pockets or recesses 12 and 13 in which are arranged spools or spindles 14, one or both of which may be provided at the ends with milled heads 15 by means of which they can be rotated from the exterior of the holder. $14^a$ indicates a web of flexible material preferably wound upon the spindle 12 and of a length several times greater than the width of the opening 9, said web extending from said spindle beneath the opening over the film and having its other end attached to the spindle 13 so that the portion written upon through the opening may be wound thereon. The web or strip $14^a$ is of such nature that it will obstruct the passage of actinic light to the film when the cover 12 is opened, but when written upon by a stylus or pencil, it will permit the passage of sufficient actinic light to cause the film beneath it to be affected by the light on the lines traced by the stylus, so that the characters will appear in the developed negative and it is found that carbon paper such as is used for manifolding, is admirably adapted for the purpose, the coating of such paper being readily displaceable by the stylus. Even if a lead pencil is used for writing, the marks made by the lead will not prevent the characters being plainly visible in the developed negative.

The film employed in connection with my invention, indicated by 16, may be of the usual variety embodying a transparent flexible celluloidal support having a sensitized coating on the side toward the exposure opening of the camera or holder and if desired to load the camera or holder in daylight, the ends of the film strip may be provided with opaque paper or paper of such nature that several convolutions thereof will prevent the passage of actinic light to the film when wound on the spools. If desired, the film proper may be provided with a paper backing or covering indicated by 17, and corresponding in size to the opaque paper usually employed in film cartridges, but when used in my camera, such paper must be sufficiently translucent to permit the passage of light through a single thickness. With this camera or holder, when the operator wishes to make any memoranda on the film, he removes the cover 11 from the opening 9 and inserting his pencil or stylus, writes in the ordinary manner on the web or covering 14$^a$, displacing the coating or otherwise affecting its opacity, then exposes the opening to a sufficiently intense light to fog the film on the indicated lines and then closes the cover. The portion of the frame 7 directly beneath the opening serves as a suitable support or table to receive the pressure exerted in writing. After a designation has been printed on the film, the portion of the covering 14$^a$ on which the characters were indicated is removed from beneath the opening, the film wound forward and the next indication and exposure made. If desired, the same portion of the covering can be used for printing the same legend upon the next exposure as, for instance, in taking a series of views of the same subject, the title of the picture taken could remain in position and appear in several negatives. In this case, it would, of course, be necessary to close the cover 11 while a new section of film is moved into the field of exposeure.

Instead of winding the carbon paper or other covering 14$^a$ on the roller 14, the portion written upon could readily be drawn out of the holder as through a slot or orifice in the back and torn off. If this method is employed, the slot through which the free end of the carbon paper passes is, of course, provided with means for preventing the passage of light to the film, such, for instance, as plush or velvet linings at the sides, indicated by 20 in Fig. 3.

By supporting the covering 14$^a$, portions of which may be rendered translucent, upon the removable back for the camera or holder, any ordinary camera can be adapted for negative marking by the mere substitution of one of my camera backs for the one of the kind now in use without other alteration of the parts and any film which is not provided with an opaque backing may be used. It will be understood that the invention is readily adapted to holders for sensitized materials used in photography whether embodying a lens and constituting a camera in itself, or merely as a holder for plates or films.

I claim as my invention:

1. A holder for sensitized photographic material embodying a casing having an opening therein in proximity to the sensitized material and a flexible protecting covering carried upon the casing arranged beneath the opening and over the sensitized material and movable independently of the latter, said covering being normally impermeable by actinic light but adapted to be rendered permeable to actinic light in lines traced thereon by a stylus or pencil.

2. A holder for sensitized photographic material embodying a casing having an opening therein in proximity to the sensitized material and a flexible protecting covering carried upon the casing and movable independently of the sensitized material to bring different portions thereof beneath the opening and in proximity to said material, said covering having a coating normally impermeable to actinic light but locally displaceable by means of a stylus.

3. In a photographic film holder, the combination with a casing having spool chambers, an exposing aperture between them and a removable cover extending over said chambers and in rear of said aperture and having an opening near the end of said aperture, of a flexible covering supported on the cover beneath the opening thereon, adjacent the film and movable independently of the latter, said covering having a coating impermeable to actinic light and adapted to be removed or displaced locally by writing thereon with a stylus to permit the passage of actinic light to the film.

4. In a photographic film holder, the combination with a casing having film winding and supporting devices, and an exposing aperture, of a cover extending over the rear of the film having an opening therein, a flexible covering sheet supported on the cover beneath the opening and adjacent the film, said sheet having a coating impermeable to actinic light adapted to be displaced locally by writing thereon with a stylus or pencil to permit the passage of actinic light to the film.

5. In a photographic film holder, the combination with the casing having film winding and supporting devices, an exposing aperture and an opening adjacent the film, of a movable flexible covering sheet supported on the casing and arranged beneath said last mentioned opening, said covering being impermeable to actinic light but adapted to be rendered permeable locally by writing thereon with a stylus.

6. In a photographic film camera, the combination with a casing having film winding and supporting devices, an exposing aperture and an opening adjacent the film, of a movable flexible covering sheet arranged beneath said opening and means mounted on the casing for holding and feeding said covering independently of the film, said covering being impermeable to actinic light but adapted to be rendered permeable locally by writing thereon with a stylus.

7. As an article of manufacture, a back adapted for application to film cameras having an opening through it, a movable cover for said opening and means for supporting a sheet of carbon paper at the sides of said opening only and permitting passage of light through said paper to the film.

8. As an article of manufacture, a back adapted for application to film cameras having an opening through it, a movable cover for said opening, a spindle arranged in the under side of said back on one side of the opening and a spindle on the opposite side of said opening for winding a carbon sheet across the opening.

9. A holder for sensitized photographic material embodying a casing having an opening therein in proximity to the sensitized material and a protecting covering arranged beneath the opening, over the sensitized material and movable independently of the latter, said covering being normally impermeable by actinic light but adapted to be rendered permeable to actinic light in lines traced thereon by a stylus.

10. In a holder for sensitized photographic material, the combination with a cover extending over the sensitized material and provided with an opening therein, of a covering sheet independent of the sensitized material capable of having designating marks applied thereto and supported upon the cover in position to have the designations light printed on the sensitized material by light passing through the opening.

11. In a photographic camera, the combination with a camera box having one side provided with a writing slot, of rollers arranged longitudinally at the sides of the slot, carbon paper borne by the rollers and arranged over the slot inside the said box, the coated surface of the carbon paper being arranged outwardly next to the writing slot, means for rotating the said rollers, movable means for covering the said slot, and a film table arranged adjacent to the inner surface of the carbon paper within the box.

WALTER D. MARSHALL.

Witnesses:
F. F. Church,
Russell B. Griffith.